United States Patent
Clanton et al.

(10) Patent No.: US 6,387,421 B1
(45) Date of Patent: May 14, 2002

(54) APPARATUS AND METHODS FOR MAKING MULTIPLE, PATTERNED EXTRUDATES

(75) Inventors: Gregory A. Clanton, Becker; Julie L. Holmstrom, Savage; Peter A. Huberg, Shoreview; Gerald J. Rudolph, Annandale; Scott A. Tolson, Arden Hills; James N. Weinstein, Maple Grove, all of MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 09/135,961

(22) Filed: Aug. 18, 1998

Related U.S. Application Data

(62) Division of application No. 08/803,787, filed on Feb. 24, 1997, now Pat. No. 5,843,503.

(51) Int. Cl.⁷ .............................. A21D 13/00; A21C 3/04
(52) U.S. Cl. ..................... 426/94; 426/249; 426/449; 426/516; 426/621
(58) Field of Search ................................ 426/448, 449, 426/516, 249, 618, 619, 620, 621, 94

(56) References Cited

U.S. PATENT DOCUMENTS

| | | | |
|---|---|---|---|
| 279,812 A | * | 6/1883 | Richter |
| 315,559 A | * | 4/1885 | Schwarzschild et al. |
| 1,640,842 A | | 8/1927 | Loomis |
| 1,710,369 A | * | 4/1929 | Martin .......................... 107/54 |
| 2,142,088 A | * | 1/1939 | Anderson ..................... 99/134 |
| 2,329,418 A | | 7/1943 | Persson |
| 2,366,417 A | | 1/1945 | MacMillin |
| 2,764,995 A | | 10/1956 | Krupp et al. |
| 2,774,314 A | | 12/1956 | Moser |
| 2,858,217 A | * | 10/1958 | Benson ........................... 99/80 |
| 2,858,219 A | * | 10/1958 | Benson ........................... 99/83 |

(List continued on next page.)

FOREIGN PATENT DOCUMENTS

| | | |
|---|---|---|
| DE | 2014914 | * 11/1970 |
| FR | 847554 | * 10/1939 |
| FR | 2167536 | 8/1973 |
| WO | WO 95/31108 | 11/1995 |

OTHER PUBLICATIONS

Dillon, Patricia M., Chilton's Food Engineering, Feb. 1993, "Consumer Trends—Know Which Way the Wind Blows", pp. 88, 90,93 (1993).*

Cook, "Disney's Family Cookbook", pp. 126, 127, 209, 211 (1996).*

(List continued on next page.)

Primary Examiner—Nina Bhat
(74) Attorney, Agent, or Firm—John A. O'Toole; Douglas J. Taylor; Everett G. Diederiks

(57) ABSTRACT

An extrudable food product is provided by a food cooker extruder (12) and is mixed with an additive to form a patterned food product, using a pattern forming die (20, 220). The cross-sectional area of the patterned food product is reduced from an inlet end (34) to an outlet end (36) by a factor of at least 50:1 at an average convergence angle of ≦45° while maintaining the cross-sectional pattern to form a reduced cross-sectional patterned dough, and then is extruded through a die port (13) having an opening equal to the reduced cross-sectional area to form a complexly patterned extrudate. The food product comprising, multiple extrudates are simultaneously formed with the flow rates for each extrudate being adjustable by an adjuster plug (16) including a smooth cylindrical portion (86) extendable into a passageway (14) having a circular cross section of a larger diameter than the cylindrical portion (86). A color additive is injected to provide a topical coating to the periphery of the flowing dough to lubricate and reduce friction of the periphery of the flowing dough with the passageway (22) and to produce a surface coloration on the periphery of the flowing dough.

6 Claims, 5 Drawing Sheets

U.S. PATENT DOCUMENTS

| | | | |
|---|---|---|---|
| 2,874,649 A | * 2/1959 | Pelletier | 107/54 |
| 3,014,437 A | 12/1961 | Dutchess | |
| 3,054,143 A | 9/1962 | Stenger | |
| 3,057,009 A | 10/1962 | Lipski | |
| 3,104,975 A | * 9/1963 | Bowman | |
| 3,314,381 A | 4/1967 | Fries et al. | |
| 3,344,753 A | * 10/1967 | Ramsey | |
| 3,416,190 A | 12/1968 | Mehnert | |
| 3,447,931 A | 6/1969 | Benson et al. | |
| 3,499,766 A | * 3/1970 | Vollink et al. | 426/559 |
| 3,541,946 A | * 11/1970 | Johston | 99/238 |
| 3,551,165 A | * 12/1970 | Reesman et al. | |
| 3,561,053 A | 2/1971 | Pearson | |
| 3,605,649 A | * 9/1971 | Bundus | |
| 3,615,645 A | * 10/1971 | Forkner | 99/1 |
| 3,664,779 A | * 5/1972 | La Warre | |
| 3,779,676 A | 12/1973 | Bernard | |
| 3,851,084 A | * 11/1974 | Rossen et al. | |
| 3,948,079 A | 4/1976 | Fuchs, Jr. | |
| D241,183 S | * 8/1976 | Comollo | D1/15 |
| 4,032,279 A | 6/1977 | Kim | |
| 4,076,477 A | 2/1978 | Hacke | |
| 4,139,644 A | 2/1979 | Stephenson | |
| 4,395,217 A | 7/1983 | Benadi | |
| 4,410,552 A | * 10/1983 | Gaffney et al. | 426/103 |
| 4,445,838 A | 5/1984 | Groff | |
| 4,459,094 A | 7/1984 | Sanabria | |
| 4,504,511 A | 3/1985 | Binley | |
| 4,542,686 A | 9/1985 | Bansal | |
| 4,567,055 A | * 1/1986 | Moore | 426/578 |
| 4,600,592 A | * 7/1986 | Dobis | |
| 4,614,489 A | 9/1986 | Juravic | |
| 4,626,187 A | 12/1986 | Kamada | |
| 4,678,423 A | 7/1987 | Bertolotti | |
| 4,695,236 A | 9/1987 | Predohl et al. | |
| 4,698,004 A | 10/1987 | Ramnarine | |
| 4,715,803 A | * 12/1987 | Koppa | |
| 4,748,031 A | 5/1988 | Koppa | |
| 4,786,243 A | * 11/1988 | Kehoe | 425/131.1 |
| 4,790,996 A | 12/1988 | Roush et al. | |
| 4,851,248 A | * 7/1989 | Simelunas et al. | 426/291 |
| 4,854,842 A | 8/1989 | Kobayashi | |
| 4,990,293 A | 2/1991 | Macosko et al. | |
| 5,004,619 A | 4/1991 | Kobayashi | |
| 5,019,404 A | * 5/1991 | Meisner | 426/249 |
| 5,066,435 A | 11/1991 | Lorenz et al. | |
| 5,102,602 A | 4/1992 | Ziegler | |
| D328,664 S | 8/1992 | Leahy | |
| 5,149,555 A | * 9/1992 | Flindall | |
| 5,165,949 A | 11/1992 | Farnsworth et al. | |
| 5,264,232 A | 11/1993 | Campbell | |
| 5,350,589 A | 9/1994 | Weinstein et al. | |
| 5,439,695 A | * 8/1995 | Mackey | 426/516 |
| 5,486,049 A | 1/1996 | Boatman et al. | |
| D373,671 S | 9/1996 | Laughlin et al. | |
| D374,755 S | 10/1996 | Gobble et al. | |
| D376,039 S | * 12/1996 | Pike | |
| 5,614,240 A | 3/1997 | Young | |
| 5,620,713 A | 4/1997 | Rasmussen | |
| 5,639,485 A | 6/1997 | Weinstein et al. | |
| 5,643,618 A | 7/1997 | Weinstein et al. | |
| D395,535 S | * 6/1998 | Reichkitzer et al. | |
| 5,843,503 A | * 12/1998 | Clanton et al. | 426/249 |
| D403,485 S | 1/1999 | Clanton et al. | |
| 5,882,710 A | * 3/1999 | Jury | 426/512 |

OTHER PUBLICATIONS

Morgan, "Chocolate and Candy Cookbook", pp. 55–63 (1982).*

Webster's II New Riverside University Dictionary, p. 1218 (1984).*

Website www.inthe80s.com/cereal.shtml, "Cereal of the Eighties", pp. 1–8.*

Brochure entitled "Hutt. Formpress Installations", pp. 1–4, 15–22.*

Rambauer et al, "Joy of Cooking", pp. 682–683, 1973.*

Good Housekeeping Illustrated Cookbook, 1989, Element A Slice of Bread, p. 433.

* cited by examiner

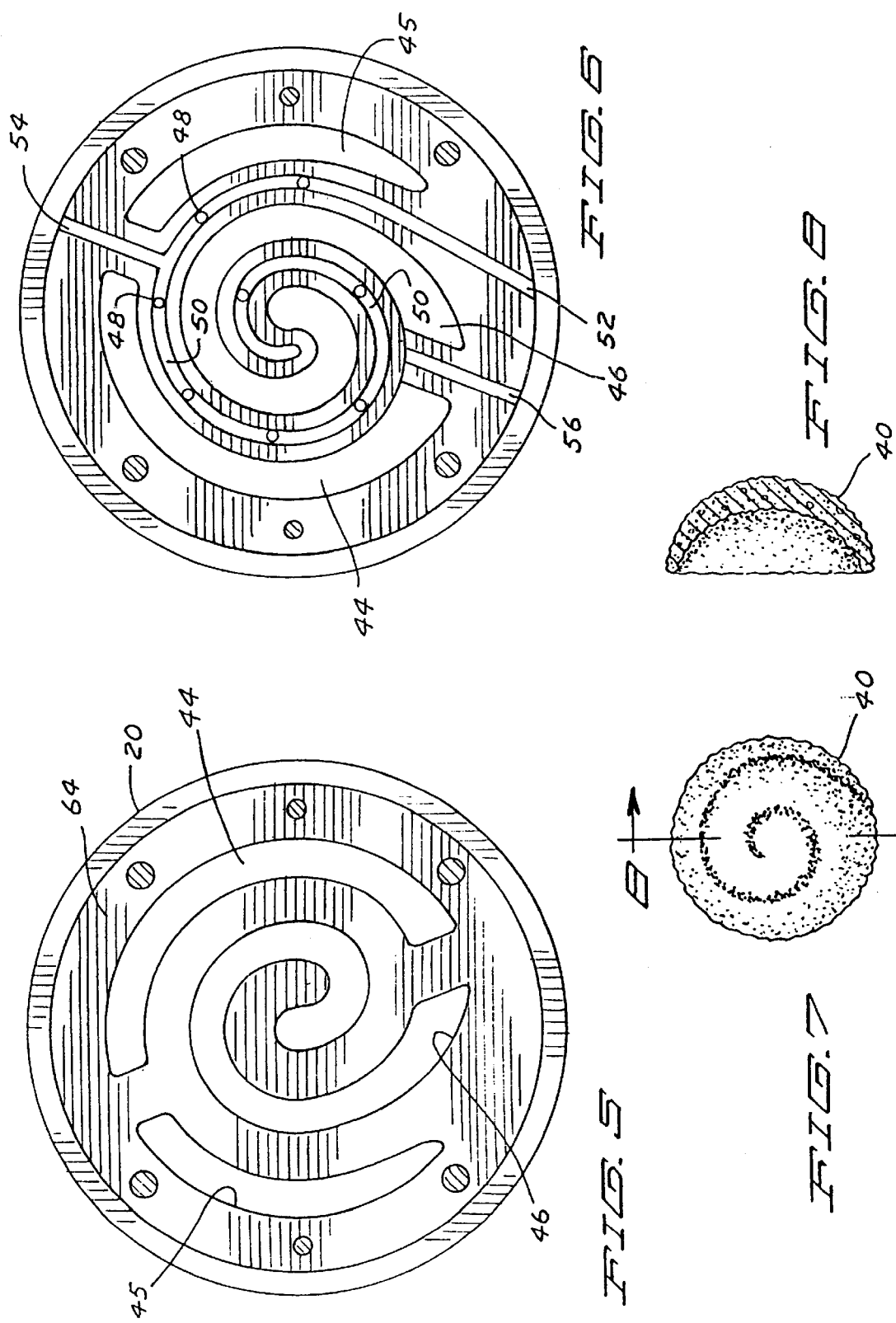

APPARATUS AND METHODS FOR MAKING MULTIPLE, PATTERNED EXTRUDATES

CROSS REFERENCE

The present application is a division of U.S. Ser. No. 08/803,787 filed on Feb. 24, 1997 now U.S. Pat. No. 5,843,503 issued Dec. 1, 1998.

1. Field of the Invention

The present invention comprises apparatus and methods for making patterned multicolored extruded food products. More particularly, the present invention relates to apparatus and methods for reducing a large cross sectional area patterned food extrudate to a smaller area while maintaining the pattern, and to apparatus and methods for adjusting flow of plastic extrudable food product.

2. Background

Food products such as Ready-To-Eat ("R-T-E") cereals and snack products vary widely in composition, shape, color, flavor, texture, etc. Such products can include both puffed and unpuffed varieties. One attractive feature is their appearance which can include specific attributes such as shape and coloration. Especially attractive are products having a complex but organized pattern of coloration, shape and/or complex shape.

A wide variety of techniques are known to provide complexly shaped products such as rings, stars, letters, figures, etc. Problems generally include how to provide consistently the desired degree of shape detail or resolution in the finished pieces. Similarly, for colored products, a problem is how to consistently provide a fine level of detail. This problem of imparting a fine level of detail is particularly difficult in the provision of complexly patterned R-T-E cereals due to their generally smaller size. The problem is even more severe for puffed R-T-E cereal products due to the very tiny size of the pellets that are expanded to form the finished products. Of course, the pellets must contain and retain the complex pattern and desirably must retain the shape detail.

In particular, it would be desirable to prepare puffed R-T-E cereals having a shape and color pattern reminiscent of various sports balls such as baseballs, footballs, basketballs and soccer balls, such as are disclosed in 1) U.S. Pat. No. Des 373,671 by Laughlin et al. entitled Food Product Piece, 2) U.S. Ser. No. 014,068, filed Oct. 12, 1993 by Laughlin entitled Food Product Piece, 3) U.S. Pat. No. Des 368,791 by Laughlin entitled Food Product Piece, and 4) U.S. Pat. No. Des 368,791 by Laughlin entitled Food Product Piece, respectively, each of which are incorporated herein by reference. Likewise, it would be desirable to prepare puffed R-T-E cereals having a shape and color pattern reminiscent of other food products or of nonfood products such as French toast, such as is disclosed in U.S. Ser. No. 29/065,077 filed Jan. 21, 1997 by Clanton et al. entitled Food Product now U.S. Pat. No. Des. 403,485 which is incorporated herein by reference. Such products are characterized in part by high degrees of resolution such as by line features (such as to indicate traditional sticking patterns) 1 mm> in thickness and even 0.5 mm>.

Providing a cereal pellet which upon puffing provides a puffed R-T-E cereal exhibiting such a fineness of detail is a difficult problem to overcome.

Line colored or externally striped food products such as R-T-E cereals as well as apparatus and methods for their preparation are described in U.S. Pat. No. 2,858,217 entitled Cereal Product With Striped Effect and Method of Making Same (issued Oct. 28, 1958 to J. O. Benson) and which is incorporated herein by reference. The '217 patent describes an extrudate extruder having a color injecting die insert for making a complexly patterned extrudate. However, the extrudate is directly extruded without any reduction in its cross sectional area. Also, the method appears to be limited to producing only flakes in a simple pattern of generally parallel more or less straight lines. The method is not capable of generating a direct expanded cereal or snack (i.e., expanded directly from the extruder) having a line detail of such a degree of fineness.

An improvement or modification in the technique for providing a line colored cereal based snack piece is described in U.S. Pat. No. 3,447,931 (issued Jun. 3, 1969 also to Benson et al.) entitled Process For Preparing a Puffed, Concave Shaped Cereal Product. More particularly, the '931 patent describes a process for making a cup flower shaped R-T-E cereal piece having a complex line pattern. The process involves extruding a plurality of rope dough filaments which are pressed together to form a column or rope without a material decrease in the cross section which is then combined under conditions such that no puffing occurs. The composite strand of compressed filaments is then cut into wafers and which are subsequently heat puffed. While useful, the process appears to be limited to producing only the "flower bloom" shape. Also, the pieces prepared are of a larger snack piece size rather than the relatively smaller pieces characteristic of R-T-E cereals.

Especially in commercial applications, the plastic extrudable food product is supplied in an amount to form a plurality of extrudates. Problems then arise that extrudates have uniformity of flow for consistency in the final product, with adjustment of the flow rate and pressure being accomplished without increasing the likelihood of downstream plugging. Furthermore, problems also arise that the extrudates interfere with each other such as by falling on top of each other thereby making downstream processing difficult.

In a first preferred aspect, the present invention provides an improvement in apparatus and methods for preparing food products characterized by at least two colors in an organized pattern. In particular, the present invention provides an improvement in the degree of fineness level of color detail (1 mm>) even on food products such as pellets for puffed R-T-E cereals that are very small (e.g., 3 to 6 mm) in diameter.

In a further preferred aspect, the present invention provides an improvement in apparatus and methods for adding additives in flowing dough. In particular, the additives are added in interstitial gaps imparted in the flowing dough. In preferred embodiments, portions of the interstitial gaps in the interior of the flowing dough are filled upstream of the addition of the additives to prevent the additives flowing into those portions. In that case, it is an aim of the present invention to prevent a disproportionate amount of additives from being on the outside of the flowing dough. In other preferred embodiments, the entire periphery of the flowing dough is topically coated with an additive having a minimal thickness and being of a mass substantially less than the mass of the flowing dough. It is an aim of the present invention to provide additives in the form of a lubricant to obtain better three-dimensional shape detail in the final products and especially expanded final products. It is further an aim of the present invention to provide additives in the form of a colorant to provide exterior periphery coloring of the flowing dough and the final product.

In a still further aspect, the present invention provides a flow rate adjustment apparatus for adjustment of plastic extrudable food flow. In particular, the present invention provides an improvement that the flow of dough is not stopped or allowed to build up which can lead to hardening of the dough, with hardened dough potentially causing plugging problems downstream.

BRIEF DESCRIPTION OF THE DRAWING

FIG. 5 shows an enlarged sectional view of the die insert taken along lines 5—5 of FIG. 4 in an upstream orientation.

FIG. 6 shows an enlarged sectional view of the die insert taken along lines 5—5 of FIG. 4 similar to FIG. 5 but showing a downstream orientation.

FIG. 7 shows an enlarged plan view of a finished puffed complexly patterned R-T-E cereal piece prepared using the present methods and apparatus of FIGS. 1–6.

FIG. 8 shows an enlarged sectional view of the R-T-E cereal piece taken along lines 8—8 of FIG. 7 showing the concave shape of the cereal piece.

FIG. 11 shows a partial, sectional view of the food cooker extruder of FIG. 10.

Figure 1:
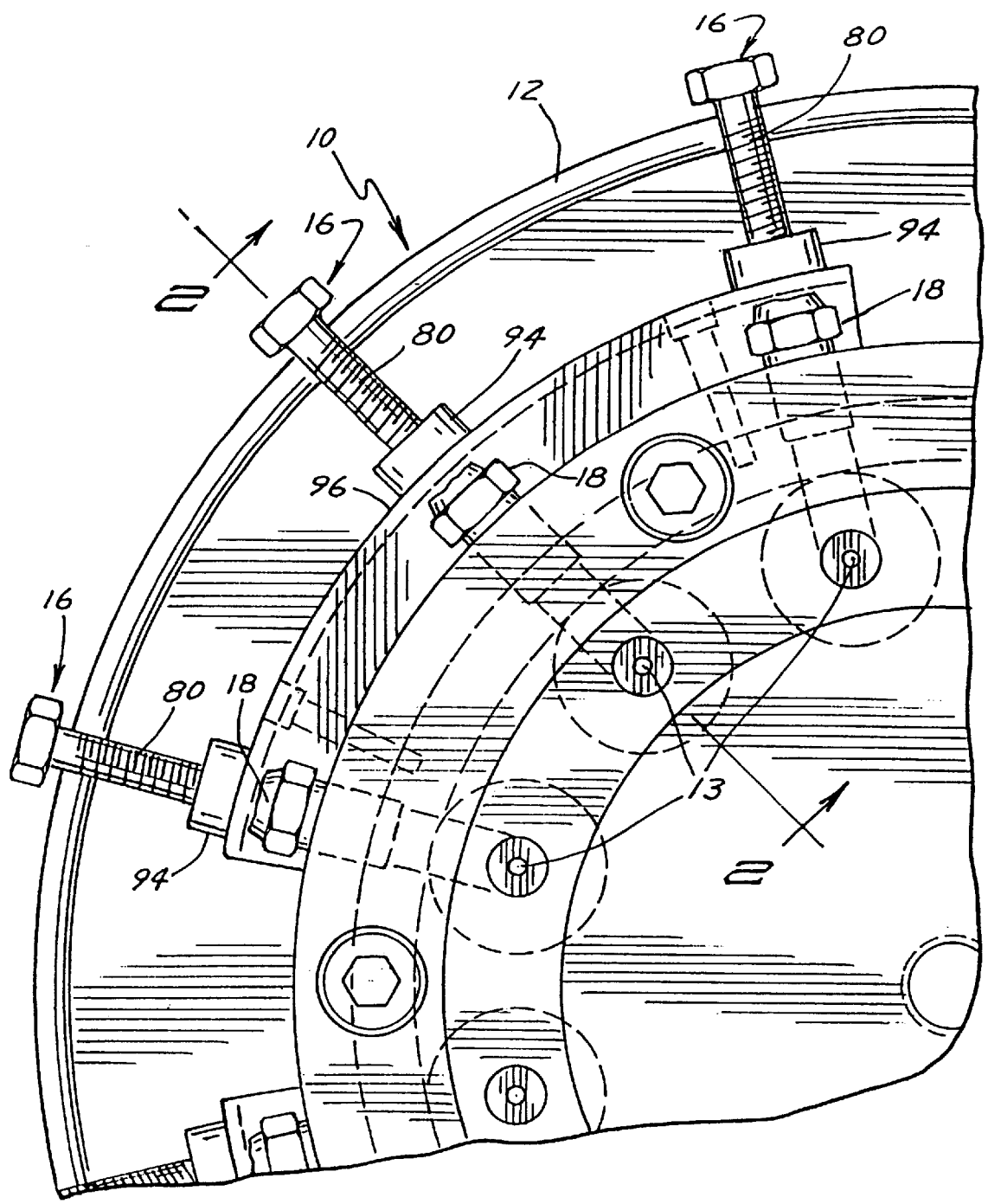
FIG. 1 shows an end view partially cut away of the die face of a food cooker extruder showing a plurality of exit ports.

Where used in the various figures of the drawing, the same numerals designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

DESCRIPTION

Referring now to the drawing and briefly in particular to FIG. 1, there is shown an apparatus for preparing a complexly patterned cereal dough piece according to the preferred teachings of the present invention that is generally designated 10. In the most preferred form, apparatus 10 generally includes a means for providing at least one extrudable food product or cooked cereal dough such as a cooker extruder 12 as seen in FIG. 1. Extruder 12 is seen to have at least one, and more preferably a plurality of, exit ports or orifices 13 each for extruding of a complexly patterned cooked cereal dough of the present invention (not shown) or other extrudable food product.

While a cooker extruder is the preferred equipment to provide the extrudable food, other conventional equipment and techniques can also be employed. For example, a batch cooker or semi-continuous cooker for cooking the ingredients in bulk can be equipped with dough forming and conveying extruder element. In other embodiments, e.g., a low moisture fruit paste, a simple screw conveyor can be employed. While in the present description particular reference is made to the provision of complexly patterned farinaceous materials such as R-T-E cereals and snack products, the skilled artisan will appreciate that the apparatus and techniques can be employed with a wide variety of extrudable food products, especially such plastic foods as low moisture fruit products.

Figure 2:
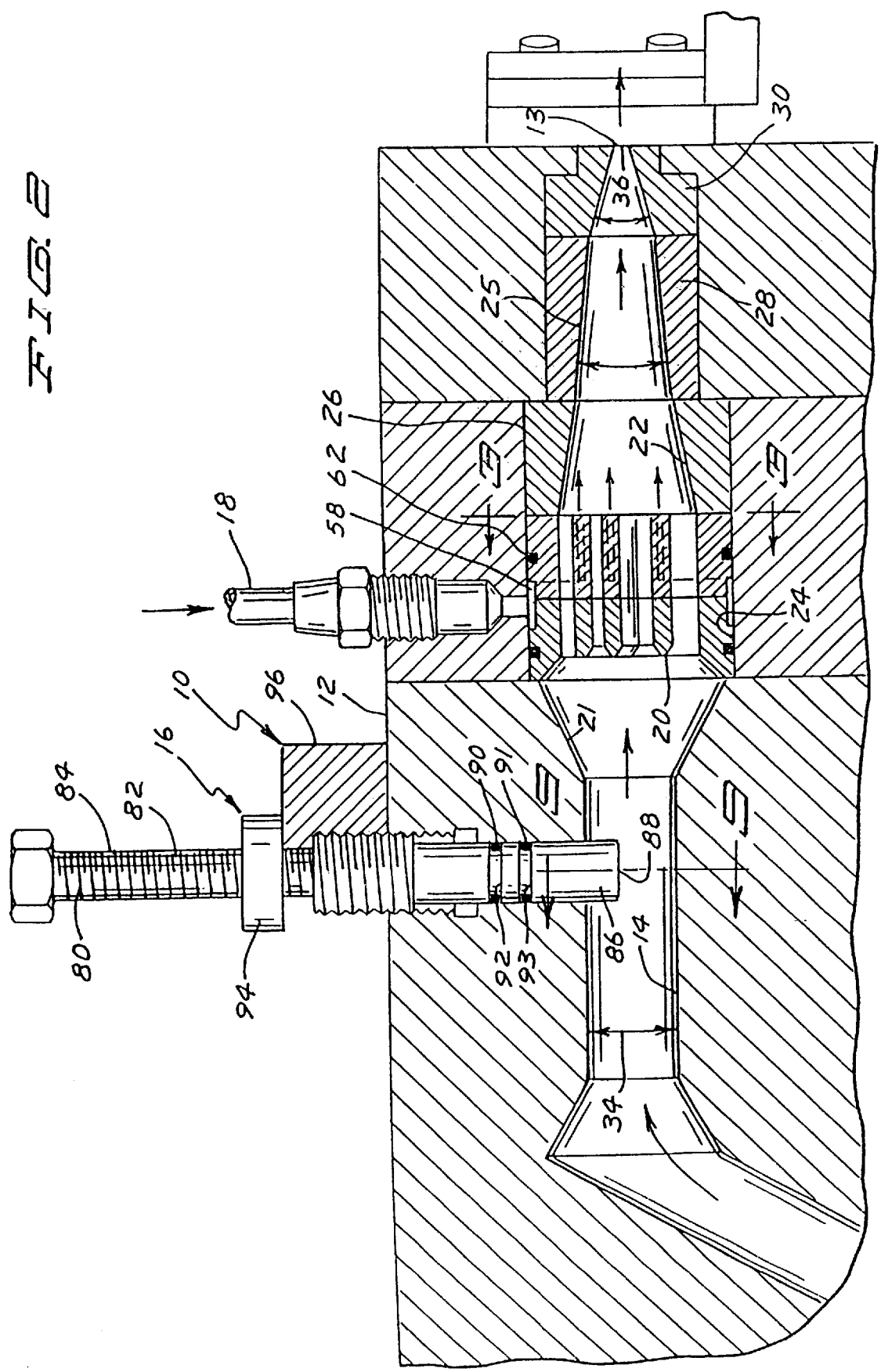
FIG. 2 shows a sectional view greatly cut away of a reduction passageway of the present invention taken along lines 2—2 of FIG. 1.

Now referring to FIG. 2, the cooker extruder 12 provides the cooked cereal dough in quantity which can supply one or preferably, especially in commercial applications, a plurality of passageways 14, each leading to an exit port 13. In highly preferred embodiments, the apparatus 10 can additionally include a means for adjusting the cooked cereal dough flow rate and pressure such as the adjustably retractable dough flow adjuster plug 16 depicted. Such a flow rate adjustment means is particularly useful when, as in the embodiment depicted, the extruder supplies a large number of extrudate orifices. Absent such a flow rate adjustment means, the particular extrudate characteristics (e.g., pressure, mass flow) from each of so many orifices are difficult to control since the length of passageway 14 from the central supply can vary.

Flow adjuster plug 16 can include a rod or bolt 80 having at least upper and lower cylindrical portions 84 and 86. Upper portion 84 in the most preferred form includes threads 82. Lower cylindrical portion 86 is in the most preferred form of a plug having a smooth outer periphery of a diameter which is less than the diameter of passageway 14. Further, the inner axial end 88 of portion 86 opposite to portion 84 has a generally flat configuration and specifically has a diameter which is considerably larger than the diameter of passageway 14. Extruder 12 has a cylindrical bore which intersects generally perpendicular with passageway 14 and which includes a radially outward, threaded portion and a radially inward, smooth portion having a diameter generally equal to and for slideable and rotatable receipt of portion 86 such that the center line of portion 86 is generally perpendicular to the center line of passageway 14. Bolt 80 further includes a threaded portion located intermediate portions 84 and 86 of a size for threadable receipt in the extruder bore. Plug 16 further includes a means for sealing against dough of extruder 12 leaking from passageway 14 such as at least a first "O" ring 90, 91 inset into a receiving peripheral seal groove 92, 93, respectively. Plug 16 can further include lock nut 94 threaded on threads 82 of portion 84 and which can be tightened against block 96 to secure bolt 80 against movement such as caused by vibration of extruder 12.

By rotating bolt 80 into or out of the extruder bore, portion 86 can be adjustably retractably extended into passageway 14. It can then be appreciated that the area of flow through passageway 14 at plug 16 is inversely related to the extent that portion 86 extends into passageway 14. It should be appreciated that portion 86 can not choke or stop dough flow through passageway 14 or provide a buildup location for dough in passageway 14. In particular, due to the smaller diameter of portion 86 than passageway 14, the outer extent of portion 86 will extend along a chord of the circular cross section of passageway 14 at a spacing from its center less than its radius allowing flow of dough therebetween. It should be appreciated that due to the circular cross sections of portion 86, dough will tend to flow around portion 86 through passageway 14 and not stop in front thereof such as can occur if a flat or other non-cylindrical surface were presented. Likewise, when portion 86 is fully retracted out of passageway 14, the extruder bore does not form locations outside of passageway 14 in which dough can accumulate. Further, due to the preferred shape of end 88 relative to passageway 14, even if bolt 80 were rotated such that end 88 engaged the wall in extruder 12 defining passageway 14, end 88 does not closely mate passageway 14 but will similarly generally extend along a chord of the circular cross section of passageway 14 at a spacing from its center less than its radius allowing flow of dough therebetween. Stopping dough flow or allowing dough buildup or accumulation can lead to hardening of the dough, with hardened dough potentially causing plugging problems downstream. In the most preferred form, with end 88 engaging the wall in extruder 12 defining passageway 14, portion 86 covers less than 90% of the cross-sectional area of passageway 14 allowing flow of dough through at least 10% of the cross-sectional area of passageway 14 at all times.

The apparatus 10 further essentially includes at least one food color supply 18 which can supply a flowable colored food material such as food color liquid (whether oil or preferably water based). The color supply 18 is in fluid communication with and the apparatus 10 further includes a means for mixing or forming the food color liquid and extrudable food product into a complexly patterned food extrudate such as a greatly enlarged (relative to the exit orifice) pattern forming die insert 20 depicted. In the preferred embodiment, the passageway 14 can include a first flared or divergent portion 21 immediately upstream of the die insert 20 to widen the passageway 14 to an equal diameter to the die insert 20 as well as a second convergent flared portion 22 downstream.

In the drawing, the passageway 14 and other constituent elements are depicted in close to actual size. Thus, the diameter of the die insert 20 is about 30 mm and is positioned within a slightly enlarged portion 24 of passageway 14. As a result, the diameter of the complexly patterned dough extrudate as it exits the die insert 20 will have an enlarged initial diameter about 30 mm. Of course, other sizes for the die insert 20 can be used (e.g., 15 to 100 mm).

In FIG. 2, it can be seen that the complexly patterned dough extrudate so formed then moves through by pressure flow and apparatus 10 further includes a means for reducing the cross sectional area of the complexly patterned food extrudate while maintaining the pattern such as a reducing or necking passageway 25 depicted. The reducing passageway 25 can be fabricated from a single piece having, for example, a frusto conical bore or, as depicted, with a plurality of individual pieces such as the first, second, and third pieces 26, 28 and 30, respectively, depicted. Individual pieces can be more easily cleaned. Also, the convergence angle and other attributes, e.g., internal surface, can be adjusted as needed (e.g., smoothness, anti-stick surface) to accommodate differences in the extrudate characteristics of different food products. In FIG. 2, it is seen that the passageway 14 has an initial relatively larger diameter 34 and a final relatively smaller or exit diameter 36 at the exit port 13. Moreover, while the passageway 14 is depicted as having a circular cross sectional area, in other embodiments the passageway 14 can be fabricated with a more complex pattern or peripheral configuration to define or define in part the exterior shape or configuration of the finished piece, including both regular shapes (e.g., stars, rings, ovoids, geometric shapes) as well as irregular shapes (e.g., animals, objects such as trees, cars, etc.). Furthermore, the passageway 14 can be fabricated with an interior surface of desired characteristics, e.g., polished or Teflon or other non-sticking surface, such as to provide decreased friction to facilitate retention of the complex pattern or to reduce the pattern's deformation. Especially desirable is an ovoid cross section for the passageway for preparation of an American style football or a rugby ball.

An important feature of the present invention is the convergence angle of the reducing passageway 25. It has been found important to maintain an average convergence or confinement angle of 5° to 45°, preferably 5° to 20°, and most preferably 10° to 15° in order to maintain the pattern while the cross sectional area is reduced. By "average convergence" is meant the angle formed from the diameter of the die insert 20 to the diameter 36 of exit port 13 over the length of the reducing passageway 25. As depicted, with passageway pieces 26, 28, and 30, some pieces, e.g., 26 and 30, have a sharper convergence angle while piece 28 has a shallower angle. Internal obstructions (e.g., shoulders) are to be avoided so as to provide a continuous passageway to minimize disrupting the complex pattern formed in the dough. FIG. 2 shows that the exit orifice diameter 36 is about 3 mm. Since the passageway 14 can have a complex cross sectional shape as described above, the extent of reduction of the pattern is more aptly characterized in terms of cross sectional area reduction rather than more simply a reduction in diameter. Thus the degree of reduction of cross sectional area in the illustrated embodiment is about 100:1. Of course, for other embodiments (e.g., for larger snack pieces), the extent of cross section reduction can be as little as 25:1. The exit orifice diameter 36 for a snack product can be correspondingly larger, e.g., 5 to 15 mm.

Surprisingly, such a shallow convergence angle allows for a reduction in cross sectional areas of at least 50:1 and even about 100:1 while maintaining a fine level of detail in the complex pattern. Thus, a complex shape can be imparted to a larger dough face or cross section and then reduced to the much smaller desired finish cross sectional area. This arrangement allows for the fabrication of a relatively large die insert to impart the complex pattern. Fabricating a small die insert to impart the desired degree of detail for the final exit diameter while possible on a development scale extruder is not commercially practical due in part to plugging or fouling of the die insert 20. The provision of a reducing passageway 25 having the requisite convergence angle allows for the provision of three dimensional shapes to be produced with a fine level of color detail. Moreover, the finished pieces are characterized by a color through the entire piece as compared to only topical coloration.

Also, it is seen that the mixing is not immediately proximate the discharge port 13 but distanced therefrom. This allows for the dough to modestly "set" so as to assist in maintaining the complex shape.

Figure 3:
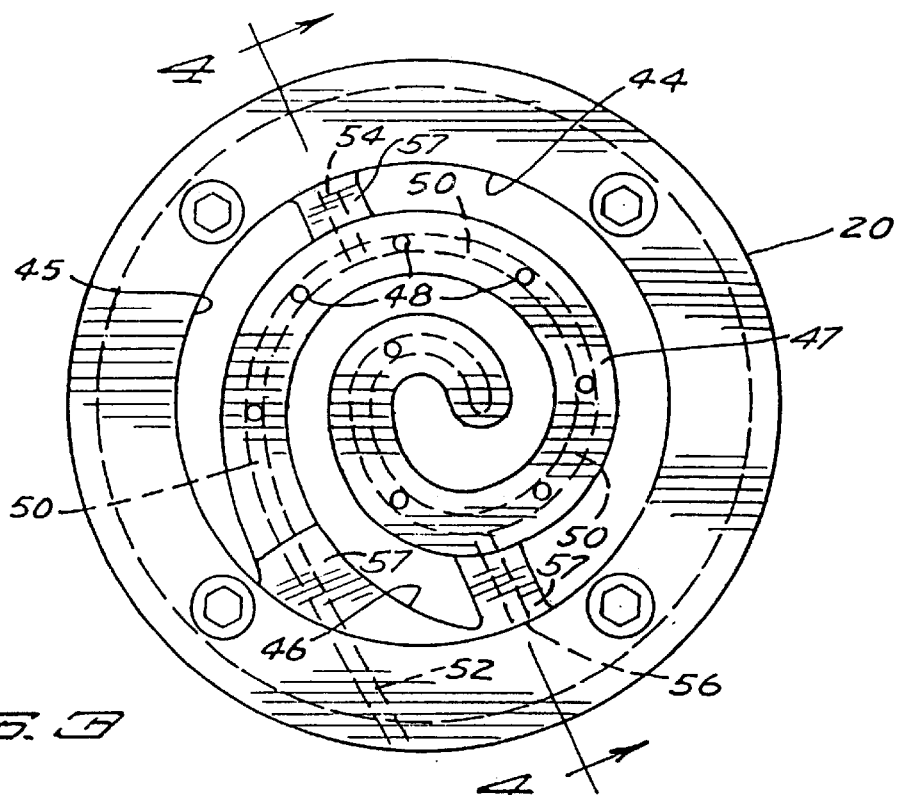
FIG. 3 shows an enlarged sectional view of a die insert for making an enlarged complexly shaped dough taken along lines 3—3 of FIG. 2.

Reference is now made to FIG. 3 which shows an enlarged cross section of the pattern forming die insert 20. As can be seen, this particular die insert can be used to fabricate a bicolored food piece 40 as seen in FIG. 7 having a swirl or spiral pattern. However, other pattern forming die inserts can be substituted therefor which, for example, can impart the line pattern for products reminiscent of soccer balls, basketballs, baseballs, and other sports objects.

The die insert 20 includes a means for imparting at least one, and more desirably a plurality of, dough interstitial gaps such as between a plurality of dough dividing passageways such as passageways 44, 45, and 46 respectively formed by die dividing members 47. The die insert 20 can further include a means for injecting a food color or second colored dough into the interstitial dough gaps such as a plurality or array of evenly spaced food color injection ports 48 formed in die dividing members 47 and fed by a fluid supplying passageway 50 therethrough. The extrudable food product itself may be colored. The color supply 18 may supply a different color or the same color having a darker or lighter hue. Specifically, the food color passageways 50 are supplied with the food liquid from one or more food color supply ports such as ports 52, 54, and 56, respectively in the die dividing members 47. Of course, when the second or colored material is a food product such as a second dough or fruit paste, the passageways and injection ports can be enlarged to reduce friction and the potential for blockage.

Figure 4:
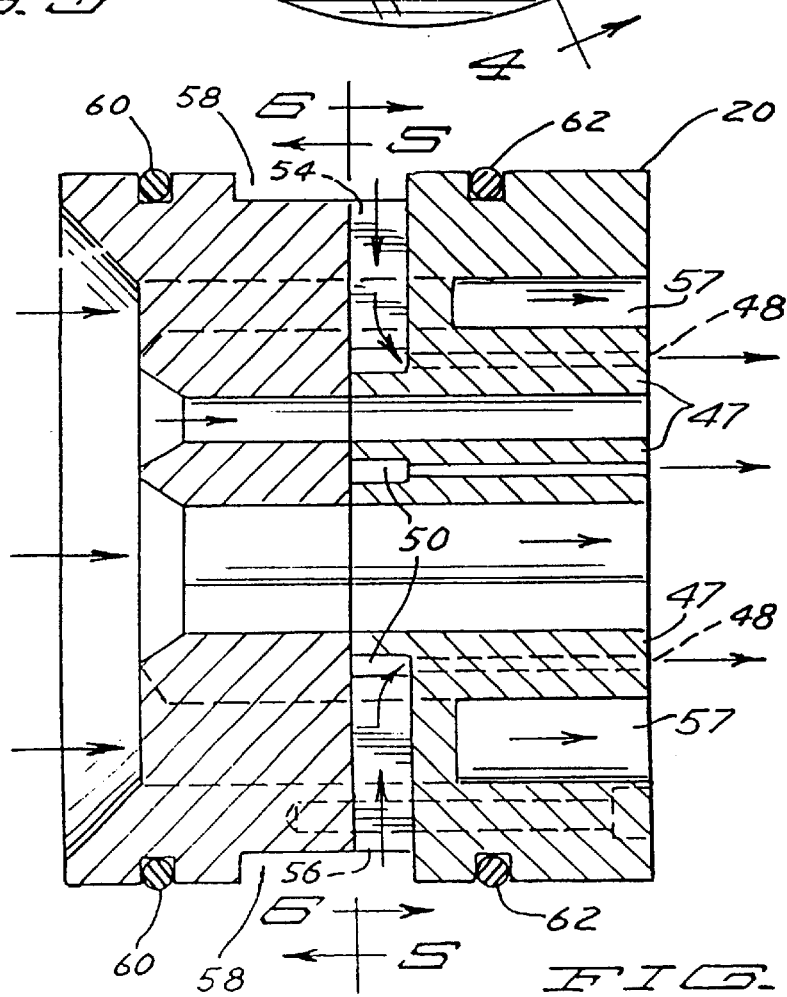
FIG. 4 shows an enlarged sectional view of a die insert showing the channels for the food color flow taken along lines 4—4 of FIG. 3.
Figure 22:
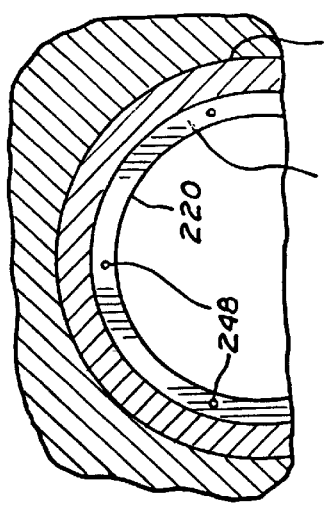

Referring now briefly to FIG. 4, it can be seen that the die insert 20 can further include a color fluid supply reservoir 58 supplied by the color supply 18 and which is in fluid communication with or supplies food color supply ports 52, 54, and 56. The die insert 20 can further include a means for sealing the color fluid supply reservoir 58 against premature admixture with dough such as "O" rings 60 and 62 depicted.

Reference is now briefly made to FIG. 5 which shows the upstream face 64 of the die insert 22. FIG. 5 shows that the upstream face 64 for this particular die insert contains no color supply discharge ports and that the discharge of color is preferably in a downstream direction.

Reference is now made briefly to FIG. 6 wherein the relationship between the supply inlet ports 52, 54, and 56, supply passageways 50 and color discharge ports 48 can be most simply seen. It can then be appreciated that the color will tend to fill the interstitial gaps in the flowing dough between passageways 44, 45, and 46 formed by and behind die dividing members 47 to create a line in the shape of die dividing members 47 in the extruded dough flow. Referring now to FIGS. 3 and 4, notches 57 are provided in die dividing members 47 extending axially from the downstream face towards but spaced from upstream face 64 and specifically upstream from the discharge ends of ports 48. The axial length of notches 57 is sufficient such that the dough extruded through passageways 44, 45, and 46 tends to flow into and fill the portions of the interstitial gaps in notches 57 upstream of where the color is discharged from ports 48. The portions of the interstitial gaps axially in line with notches 57 are then filled with dough upstream from where the color is discharged to prevent color added by ports 48 from flowing into those portions.

In the preferred form shown in FIGS. 3 and 4, notches 57 are shown formed in die dividing members 47 intermediate ports 48 and the interior surface wall and in the preferred form adjacent to the interior surface wall of die insert 20. If die dividing members 47 extend to and engage the interior surface wall of die insert 20, color will tend to travel in the interstitial gaps all the way to the interior surface wall of die insert 20 and will tend to fill the void between the dough passing through passageways 44, 45, and 46 and the interior surface wall of die insert 20. This leads to a disproportionate amount of color being on the outside of the extruded dough. Thus, notches 57 generally prevent color from traveling all the way to the interior surface wall of die insert 20 to practically eliminate or reduce the color on the outside of the extruded dough.

It can also be appreciated that notches 57 can also be provided in die dividing members 47 spaced from the interior surface wall of die insert 20. One reason for such an arrangement would be where multiple colors are desired in the extruded dough. This can be accomplished by supplying a first color to certain of the ports 48 with the other ports 48 being supplied with a different color(s) or hue(s). Notches 57 can then be provided in die dividing members 47 separating those certain ports 48 from the other ports 48 to generally prevent intermixing of the additives in the extruded dough.

Reference now is next briefly made to FIGS. 7 and 8 which show that the food piece 40 produced by the methods and apparatus of FIGS. 1–6 can have a cupped shape and that the coloration can extend throughout the body of the piece. The piece 40 depicted is a puffed R-T-E cereal piece prepared by direct expansion from the extruder having a finished diameter of about 70 mm.

In the present invention, the complexly patterned dough of reduced cross sectional diameter is extruded through the reduced diameter exit orifice 36 (e.g., about 3 mm). Thereafter, the extrudate is face cut in a conventional manner to form individual pieces such as with one or more rotating knives. Depending upon the conditions of the extrudate, an unpuffed pellet piece can be formed for subsequent puffing, or, alternatively, and preferably herein, a directly expanded finished puffed piece is formed. The finished food piece whether subsequently puffed or puffed by direct expansion upon exiting the exit orifice 13 is essentially characterized by exhibiting a high resolution or fine degree of color detail. The detail can include surface line coloration of as thin as about 0.5 mm in the puffed product. In certain embodiments, the interior is also bicolored or multicolored as well as having topical or surface coloration.

While in the present invention, the particular die insert 20 depicted is designed to admix a liquid food color into a cooked cereal dough so as to provide line coloration of extremely fine detail, the die insert 20 can be modified (e.g., such as by enlargement of ports 52, 54, and 56, fluid passageways 50, and discharge ports 48) to admix two or more cooked doughs or other flowable colored food materials, especially liquefied fats (e.g., chocolate, cheese), or fruit paste.

Also, while the particular die insert 20 depicted is designed to provide the swirled finished product depicted, other die inserts can be interchanged to provide the line coloration detail to provide the particular desired end products such as the various sports balls (e.g., soccer, baseball, basketball, American football) referenced above.

It will be appreciated that for those embodiments that are extruded without direct expansion or puffing upon extrusion that lines having a detail of about 0.1 mm in width can be obtained. Upon subsequent expansion (e.g., deep fat frying, gun puffing, fluidized bed puffing, radiant heat puffing or other puffing methods), puffed pieces will of course expand causing an increase in the width of the line. These enlarged lines (i.e., 0.5 mm>), however, are nonetheless thinner than lines obtainable by any other known method. If desired, thicker lines (e.g., about 3 mm) can also be formed.

Figure 10:
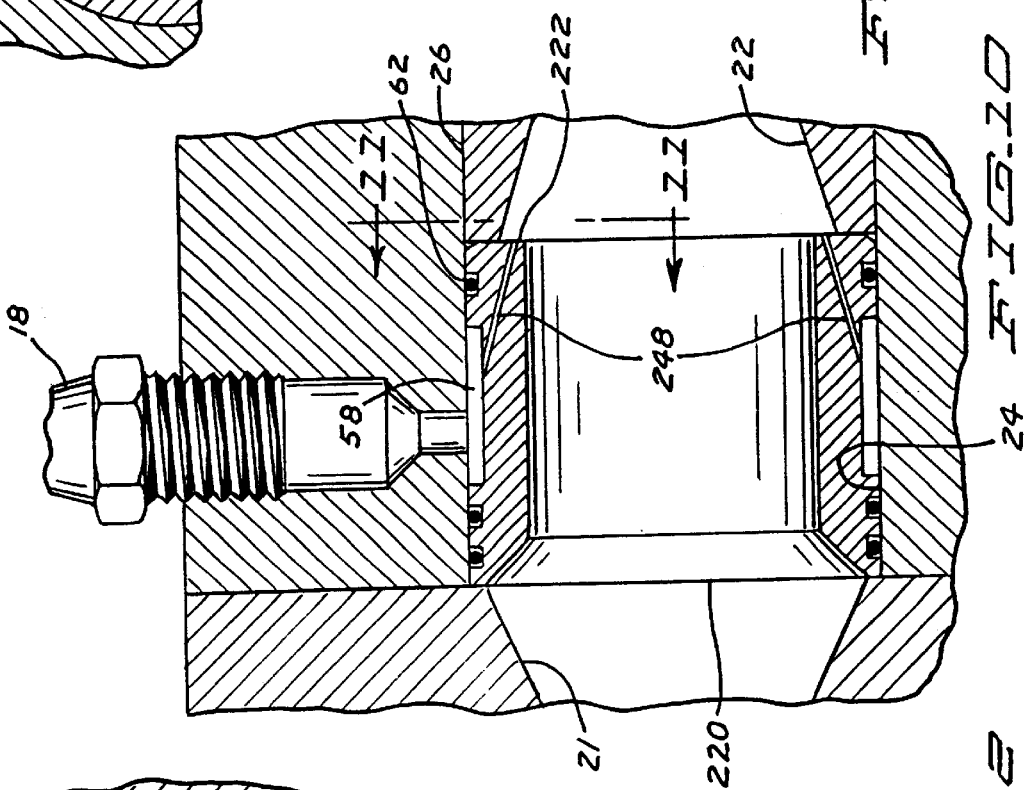
FIG. 10 shows a partial, enlarged, sectional view of a food cooker extruder according to the preferred teachings of the present invention.
Figure 9:
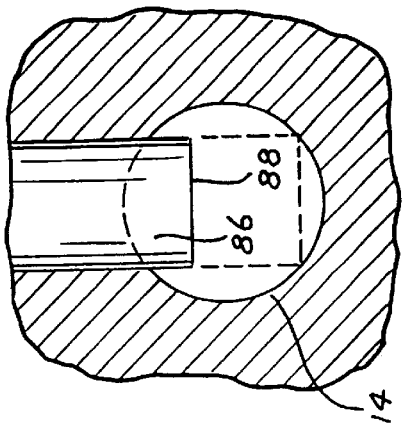
FIG. 9 shows a partial, sectional view of the food cooker extruder taken along lines 9—9 of FIG. 2.
Figure 12:
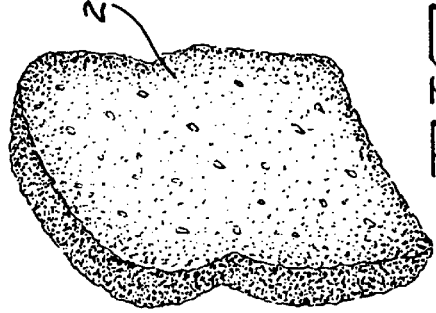
FIG. 12 shows an enlarged plan view of a finished puffed patterned R-T-E cereal piece prepared using the present methods and apparatus of FIGS. 10 and 11.

Reference is now made to FIGS. 10 and 11 which show an alternate form of a die insert 220 which can be used to fabricate a bicolored food piece 240 as seen in FIG. 12 having an exterior periphery coloring. Specifically, die insert 220 imparts a dough interstitial gap in the dough flow at the upstream end of reducing passageway 25 and around the entire periphery of the dough flow sliding in a direction relative to the interior surface wall of flared portion 22. In particular, the inner diameter of the interior surface wall of die insert 220 is less than the inner diameter of the interior surface wall of flared portion 22 at its upstream end abutting with die insert 220. Thus, a radially extending, annular shoulder 222 is defined by the axial end of die insert 220 which extends between the interior surface wall of the upstream end of flared portion 22 and the interior surface wall of die insert 220. Thus, shoulder 222 extends from the interior surface wall of flared portion 22 perpendicular to the direction of the flow of the dough.

Die insert 220 can further include a means for injecting an additive in the form of food color and/or lubricant into the interstitial dough gap. In the preferred form, the additive is injected with a point discharge rather than a continuous discharge into the interstitial gap and in the most preferred form is injected through a plurality of evenly circumferentially spaced injection ports 248 having first ends intersecting with reservoir 58 and having second ends terminating in annular shoulder 222 at a diametric distance greater than the inner diameter of die insert 220 and less than the inner diameter of flared portion 22 at its upstream end abutting with die insert 220. Ports 248 have a dimension perpendicular to the direction of the dough flow and parallel to the periphery of the flowing dough which is substantially smaller than that of shoulder 222 and of the interstitial gap. It can be appreciated that the additive will tend to flow from supply 18 into reservoir 58 through ports 248 and fill the interstitial gap in the flowing dough formed by and behind shoulder 222 to create a line in the shape of the periphery of the dough flow for flowing parallel to and providing a topical coating for the periphery of the dough flow. In the most preferred form, five ports 248 are provided to insure that the additive is provided in an amount to fill the interstitial gap extending around the entire periphery of the flow of dough and so that the topical coating extends over the entire periphery of the flowing dough. It should be appreciated that the additive in the topical coating has a minimal thickness and is of a mass substantially less than the mass of the dough flow and in the most preferred form where the additive is a colorant to produce a surface coloration on the flowing dough. In the most preferred form, the ratio by mass or weight of dough versus additive introduced through ports 248 is in the order of 200:1.

The upstream face of die insert 220 contains no discharge ports and the discharge of additive is preferably in a downstream direction. In the most preferred form of the present invention as shown in FIGS. 10 and 11, the additive is located exclusively on the periphery of the dough flow. However, it should be appreciated that die insert 220 can include die dividing members 47 such as but not limited to of the type shown and described for die insert 20.

Figure 13:
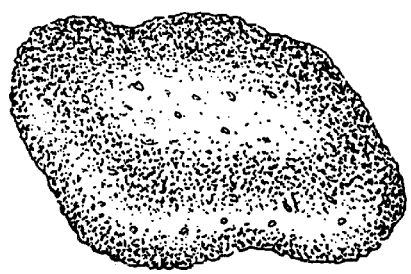
FIG. 13 shows an enlarged plan view of a finished puffed R-T-E cereal piece extruded through the same exit orifice as the piece of FIG. 12 but without the provision of a lubricant according to the present methods and apparatus of FIGS. 10 and 11.

It should be noted that the additive in the form of a colorant provided in the interstitial gap imparted by shoulder 222 results in the topical or surface coloration of the entire, exterior periphery of the dough flow. Further, in the preferred form, the colorant provided in the interstitial gap imparted by shoulder 222 performs as a lubricant to reduce friction between the exterior periphery of the dough flow and the interior surface wall of reducing passageway 25. Reducing friction allows the pressure at which the dough is forced through passageway 25 to be reduced for the same throughput. Additionally, this reduction in friction has been found to result in better three-dimensional detail and is especially important for affecting the expansion characteristics of the dough. Specifically, it has been found that when the extrudate is face cut and then expanded, the cut faces of the expanded food piece 240 are generally planar and extend generally perpendicular to the periphery of food piece 240 as shown in FIG. 12. Thus, it is possible to obtain square edges when the extrudate is expanded, which is especially important when the extrudate is cooked cereal dough that will be expanded. In contrast, when lubrication is not provided to the dough flow, the expanded food is more pillow-shaped or cat-eyed as shown in FIG. 13. It should be appreciated that the dough for forming the food pieces of FIGS. 12 and 13 flowed through exit orifices 13 of the same size and shape.

In the most preferred form, food piece 240 is of the shape and appearance of a French toast but of a much reduced size. In particular, food piece 240 includes a body having first and second cut, generally parallel faces and a peripheral edge. In the preferred form, the body is formed of extruded dough and in the most preferred form is formed of expanded, extruded dough such as by puffing or direct expansion. The body within the peripheral edge and intermediate the first and second faces is of the color of the dough which in the most preferred form is uniform. The additive forming the topical coating is of a color different than the color of the dough and is located on the peripheral edge to represent the crust or brown surface of a slice of bread. It should be appreciated that one or both faces may be colored after face cutting the dough such as by the application of a sugar coating including a colorant.

Although in the most preferred form the additive introduced by ports 248 into the interstitial gap imparted by shoulder 222 acts as a lubricant for reducing friction between the dough flow and passageway 25 and results in the surface coloration of the periphery of food piece 240, the additive does not necessarily need to include a colorant or produce such a surface coloration of food piece 240. Generally, additives which function as lubricants include aqueous solutions and possibly oil based solutions which do not adversely affect the dough or the final piece 40 and 240 produced therefrom.

In the most preferred form, ports 248 are linear between reservoir 58 and shoulder 222 for ease of cleaning. Further, ports 248 extend upstream at a relatively small acute angle and in the most preferred form at an angle in the order of 10° to the interior surface wall of die insert 220 and thus the direction of the flow of dough therethrough to reduce the tendency of dough to backflow therein and thereby plugging ports 248. In this regard, the presence of shoulder 222 enhances the formation of the interstitial gap between the dough and passageway 25 at the interconnection of insert 220 and passageway 25. Thus, the interstitial gap is of a size to insure that the additive can flow between the ports 248 and around the entire circumferential periphery of shoulder 222. Further, eddy currents are created in the interstitial gap which tend to draw the additive through ports 248 and discourage back flow into ports 248. Thus, the presence of shoulder 222 provides more control and better uniformity over the introduction of the additive around the entire periphery of the dough flow.

The extrudable food can comprise a wide variety of conventional food types and in particular can include a fruit material such as paste or pieces, potato dough (e.g., for a fabricated chip), aerated confections (e.g., for the fabrication of marbits or marshmallows) or a cooked cereal dough. The cooked cereal dough can be for either R-T-E cereals (whether puffed or unpuffed), snack products, baked goods, or pastas. Especially desirable are cooked cereal doughs for puffed R-T-E cereals. Puffed food products such as snacks can be prepared by hot air puffing, deep fat frying, gun puffing or microwave (especially high intensity, e.g., >100 V/cm field strength). Product puffed without deep fat frying can have oil added to the composition or have a topical oil application. R-T-E cereals can have a sugar coating. Puffed food pieces of the product base (i.e., prior to or without oil or sugar) can have a density of about 0.1 to 0.5 g/cc. The colored portion forms a line or a plane through the body of the food piece. "Highly complex" food products are characterized as having a plurality of colored features at least two of which (e.g., two planes or a line and a plane) intersect within the body of the food piece.

Other dough flow adjustment devices can be used with or in substitution for the preferred flow adjuster plug 16 herein if 1) positioned upstream of the die insert 20 or 220, and 2) do not increase the likelihood of downstream plugging.

Now that the basic teachings of the present invention have been explained, many extensions and variations will be obvious to one having ordinary skill in the art. For example, several inventive aspects of the present invention have been disclosed and it is believed that the combination thereof produces synergistic results. However, such inventive aspects can be utilized alone or in other combinations according to the teachings of the present invention. As an example, although notches 57 have been disclosed in die insert 20 forming complexly patterned extrudates, similar inserts could be provided upstream of a static mixer to provide several lines of colorant, flavor or other additives rather than typical point type injections into the cross section of flow. In particular, notches 57 prevent the colorant, flavor or other additives from coming in contact with the interior surface wall of the insert where the static mixer has difficulty mixing it thoroughly with the main flow of product. This would allow the static mixer to be shorter and still provide a uniform extrudate and thus reducing the cost, space and pressure drop requirements of the static mixer.

Similarly, although the introduction of an additive in the form of a colorant and/or lubricant has been disclosed in connection with a cross section reduction of a relatively large degree, the apparatus of FIGS. 10 and 11 can be utilized in other applications where exterior periphery coloring and better three-dimensional shape detail are desired according to the teachings of the present invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A food piece comprising:
    a cereal body formed by cutting an extruded dough, having an as associated color, to define first and second, generally parallel faces of the body, each of said first and second faces having a color corresponding to the associated color of the extruded dough, said body also including an outermost peripheral side edge portion which extends about the first and second faces and defines a spacing between the first and second faces; and
    an additive, constituting a topical coating, arranged solely upon and entirely about the peripheral side edge portion of the body, said additive having a color which is different than the color of the first and second faces, wherein the food piece has a weight ratio of body versus additive in the order of 200:1.

2. The food piece of claim 1 wherein the body, within the peripheral side edge and intermediate the first and second faces, is entirely of the color of the first and second faces.

3. The food piece of claim 1 wherein the color of the additive is darker than the color of the first and second faces.

4. The food piece of claim 3 wherein the food piece has an associated size and shape substantially corresponding to a miniature piece of french toast.

5. The food piece of claim 1 wherein the food piece constitutes an aerated confection.

6. The food piece of claim 1 further comprising at least one lime coloring feature provided throughout the body, with the line coloring feature having a thickness of between 0.1–3 mm.

* * * * *